United States Patent
Klein et al.

(10) Patent No.: US 8,327,343 B2
(45) Date of Patent: Dec. 4, 2012

(54) METHOD AND SYSTEM FOR OPTIMIZING SOURCE CODE

(75) Inventors: Marcos S. Klein, Mountain View, CA (US); Richard Brian Livingston, Doral, FL (US); Vinod Pandarinathan, Chennai (IN); Venkata Rajasekharu Athreyapurapu, Srikakulam (IN)

(73) Assignee: Cisco Technology, Inc., San Jose, CA (US)

(*) Notice: Subject to any disclaimer, the term of this patent is extended or adjusted under 35 U.S.C. 154(b) by 1573 days.

(21) Appl. No.: 11/254,268

(22) Filed: Oct. 20, 2005

(65) Prior Publication Data

US 2007/0094650 A1    Apr. 26, 2007

(51) Int. Cl.
*G06F 9/45* (2006.01)

(52) U.S. Cl. .................. 717/159; 717/140; 717/151

(58) Field of Classification Search .......... None
See application file for complete search history.

(56) References Cited

U.S. PATENT DOCUMENTS

| 6,345,384 | B1 | 2/2002 | Sato | |
|---|---|---|---|---|
| 6,792,595 | B1* | 9/2004 | Storistenau et al. | 717/110 |
| 2005/0097528 | A1* | 5/2005 | Chakrabarti et al. | 717/140 |

OTHER PUBLICATIONS

Levine, "Linkers & Loaders", Jan. 15, 2000.*

* cited by examiner

*Primary Examiner* — Lewis A Bullock, Jr.
*Assistant Examiner* — Mark Gooray
(74) *Attorney, Agent, or Firm* — Fish & Richardson P.C.

(57) ABSTRACT

Methods, systems and apparatus for optimizing a source code are provided. Dependencies for each header file and source code file in the source code are identified for all possible compilation contexts. Certain dependencies can be classified into complete types and incomplete types or named references. Further, these incomplete type dependencies are removed by adding forward declarations where appropriate.

15 Claims, 4 Drawing Sheets

METHOD AND SYSTEM FOR OPTIMIZING SOURCE CODE

BACKGROUND OF THE INVENTION

1. Field of Invention

Embodiments of the invention relate in general to code optimization. More specifically, the embodiments of the invention relate to methods and systems for optimizing a source code.

2. Description of the Background Art

A series of statements, written in any programming language, is referred to as a source code. Examples of programming languages include, but are not limited to, C, C++, Java, Pascal and Hyper Text Markup Language (HTML). A source code can be either compiled or interpreted to render it executable. Multiple compilation contexts may exist within a source code, yielding different executables. Optimization of a source code may impact multiple executables.

Further, a source code may be organized into several source code files. Some of the source code files may be related to each other. For example, a header file may be included to resolve one or more symbols defined in a C file. Hence, compiling or interpreting a source code file may necessitate the compilation or interpretation of another source code file that is related to the former source code file. For example, with reference to the example mentioned above, compiling the C file may necessitate the compilation of the header file as well.

Compiling or interpreting a large number of source code files in the source code may require a considerable amount of time. A significant part of this compilation or interpretation time can be saved if the source code has been optimized. Optimization of the source code involves conforming to certain coding standards.

The source code may be optimized while it is being generated. However, in the case of source codes with a large number of related source code files, it may be difficult to manage and optimize the source code files during the process of generation. Moreover, after the generation of the source code, it may be necessary to make several changes to it, for the purpose of maintenance. These changes may be made at different times by different programmers, which makes it difficult to keep the source code optimized.

The process of compilation or interpretation of source code files that have not been optimized properly may place an unnecessary burden on a system performing this process. This would affect the overall performance of the system.

Further, some relationships included in the source code may be unnecessary. For example, a header file containing thousands of identifiers may have been included in a C file to resolve only a few identifiers. While compiling the source code, such header files are compiled completely. This may place an unnecessary burden on the system and waste time.

In addition, some relationships in some programming languages are known as named relationships, opaque types or incomplete types, which exist for strong type-checking. While these relationships may be satisfied by a full and complete definition, it may be preferred to satisfy the definition with an incomplete type.

DESCRIPTION OF VARIOUS EMBODIMENTS

Figure 1:
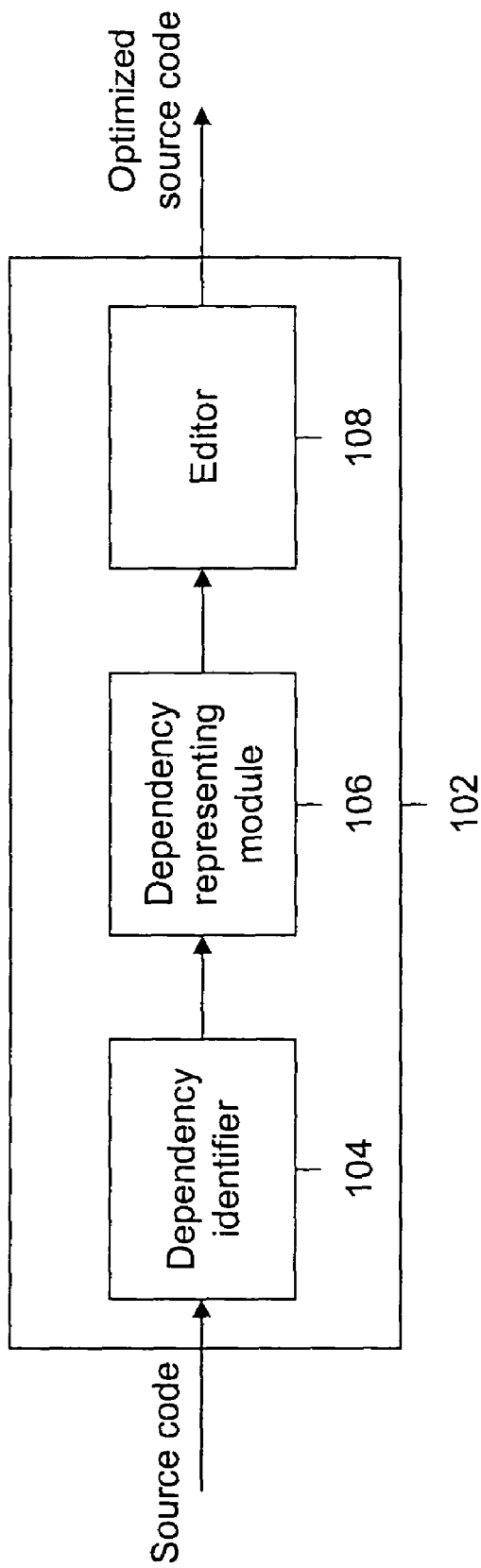
FIG. 1 is a block diagram illustrating various elements of a system for optimizing a source code, in accordance with various embodiments of the invention.

A source code may include a number of dependent source code files. Many of the dependent source code files may include certain file dependencies that can be replaced with named references. The removal of such dependencies may help in decoupling the source code while decreasing the compilation time, reducing complexity, reducing unnecessary recompilation, and increasing source code quality by decreasing the likelihood of accidental macro redefinition.

Various embodiments of the invention provide methods, systems and computer program products for optimizing a source code. Embodiments of the invention provide a method that enables the optimization of the source code by the removal of certain file dependencies. The dependencies included in the source code are identified and then reduced.

These dependencies can be classified into incomplete type dependencies and complete type dependencies, based on the type of usage. An incomplete type dependency is included when data of an incomplete type used in a first source code file is defined in a second source code file. For example, an incomplete type dependency is included when a data object used in a source code file A is a pointer of type struct, union or enum defined in another source code file B. An incomplete type data is data with a type that has no value or meaning. Examples of incomplete type data include, but are not limited to, pointers to structs, unions and enums, where size and member information is irrelevant. In an exemplary embodiment of the invention, incomplete type dependency includes the use of named references.

In accordance with various embodiments of the invention, the incomplete type dependency between two source code files is removed if there are no other complete type dependencies between the two source code files. For this purpose, the source code is parsed to identify all the dependencies. Further, information about the incomplete type dependencies is used to add forward declarations to the relevant source code files. The addition of the forward declarations nullifies the incomplete type dependencies, which can then be removed. Further, the source code is modified to fix all the incomplete type usages in the relevant source code files. Finally, the dependencies are removed from the relevant source code files, decoupling the dependency between the source code files.

Consider, for example, that an implementation file is dependent on an interface file for a single named reference. A forward declaration can be added to the implementation file to nullify its dependence on the single named reference. After the addition of the forward declaration, the implementation file is no longer dependent on the interface file, and the inclusion and resultant compilation of the interface file can be removed from this context.

Further, the system for optimizing the source code is completely automated and does not require any manual configurations. The source code to be optimized may be selected by the user or the system, in accordance with various embodiments of the invention. Further, the information about the incomplete type dependencies can be stored in a database, in the system or outside it. This information can be accessed by the system automatically, without any manual intervention by the user, in accordance with an embodiment of the invention.

FIG. 1 is a block diagram illustrating various elements of a system 102 for optimizing a source code, in accordance with various embodiments of the invention. System 102 includes a dependency identifier 104, a dependency-representing module 106, and an editor 108.

Dependency identifier 104 identifies all the dependencies included in the source code, in accordance with various embodiments of the invention. For this purpose, dependency identifier 104 parses the source code. In accordance with various embodiments of the invention, dependency identifier 104 includes a dependency compiler, which parses the source code.

Further, dependency-representing module 106 constructs an intermediate data representation, from the parsed source code received from dependency identifier 104. This intermediate data representation is an intermediate summary of the dependencies. These dependencies in the intermediate data representation may be removed from the relevant source code files. In accordance with various embodiments of the invention, the intermediate data representation is constructed from the records of relationships between the source code files and the information about the incomplete type dependencies. This intermediate data representation can be stored, to enable information retrieval at a later stage, in accordance with an embodiment of the invention. Further, forward declarations are constructed with the use of information from the output of the dependency compiler, in accordance with various embodiments of the invention.

Further, editor 108 outputs an optimized source code with appropriate forward declarations and no incomplete type file dependencies. For this purpose, editor 108 reads the intermediate data representation to add forward declarations to source code files exhibiting incomplete type dependencies. In accordance with various embodiments of the invention, the forward declarations are added if there are no other complete type dependencies between the source code files.

In accordance with various embodiments of the invention, editor 108 modifies the relevant source code files in the source code. The modification of the source code can be based on the pre-defined criteria. In accordance with an embodiment of the invention, editor 108 uses the intermediate data representation to modify the relevant source code files and replace the inclusion of files with the incomplete type usages, in the relevant source code files. In accordance with an embodiment of the invention, editor 108 removes source code files from the context that resolved the incomplete types in the relevant source code files.

In accordance with various embodiments of the invention, the process of editing can be performed manually by the user. In accordance with an embodiment of the invention, system 102 may offer the user a choice, to make a selection from a set of instructions on the basis of which the source code files may be modified and removed. Further, system 102 may provide the line number and suggest the forward declarations to be added in the relevant source code files to the user, and ask for a confirmation from the user. Thereafter, system 102 may modify the source code by adding the forward declarations and removing the source code files from the context that resolved the incomplete types in the relevant source code files, based on the user's input.

Figure 2:
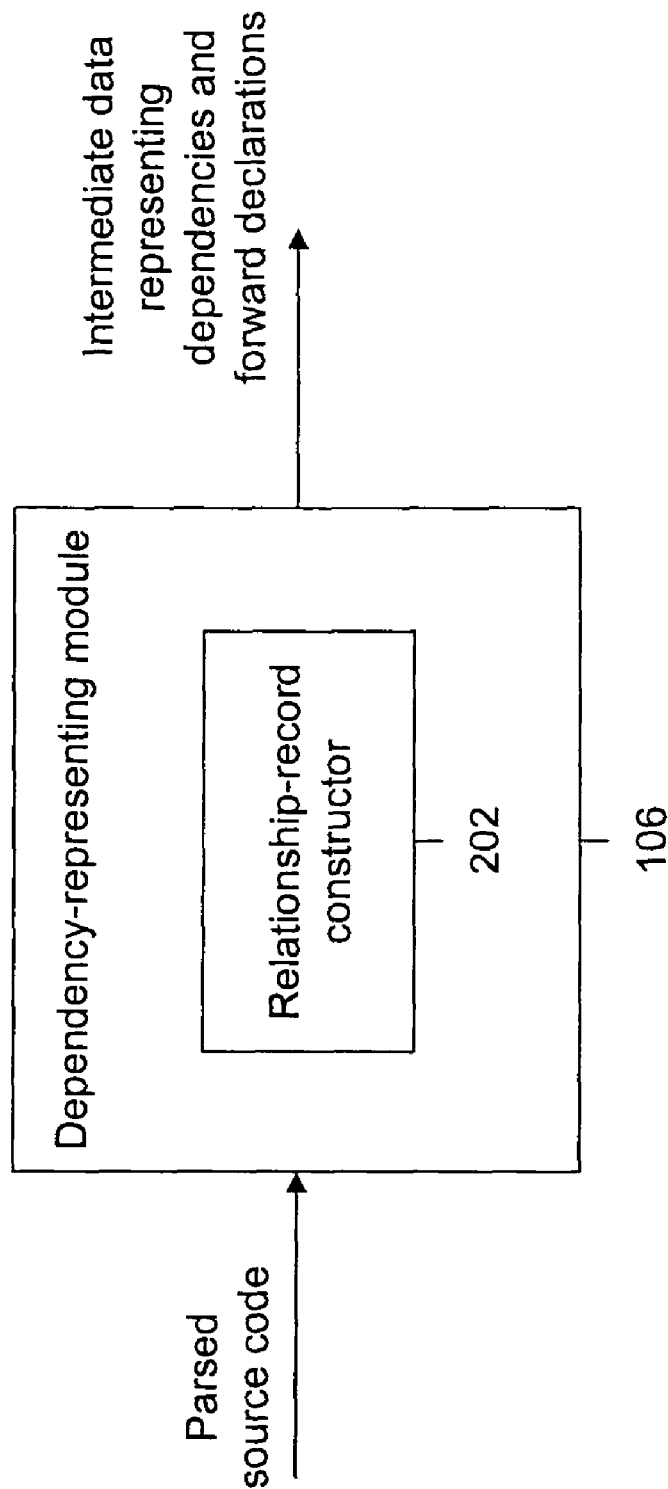
FIG. 2 is a block diagram illustrating a dependency-representing module, in accordance with various embodiments of the invention.

FIG. 2 is a block diagram illustrating dependency-representing module 106, in accordance with various embodiments of the invention. In accordance with various embodiments of the invention, dependency-representing module 106 includes a relationship-record constructor 202. Relationship-record constructor 202 constructs records of all the relationships between the source code files. These relationship records can be stored in a database, a dependency graph, contextual lists, or a series of hierarchical flat files. These relationship records capture all the dependencies included in the source code, in accordance with an embodiment of the invention. Further, dependency-representing module 106 creates the forward declarations and stores them in an internal table, which is an internal representation of the dependencies. This internal table is a part of the intermediate data representation, in accordance with an embodiment of the invention. Further, this internal table records the file information, in accordance with an embodiment of the invention. This file information is used by editor 108 to perform the replacement of a file relationship with a named reference.

Further, editor 108 reads this intermediate data representation and outputs an optimized source code with appropriate forward declarations and no incomplete type file dependencies, if there are no other complete type dependencies. Hence, a source code that has been provided as an input to system 102 is processed by the various elements of system 102 and is output as an optimized source code. The method for acquiring the optimized source code by using system 102 is further explained with reference to FIG. 3 and FIG. 4.

Figure 3:
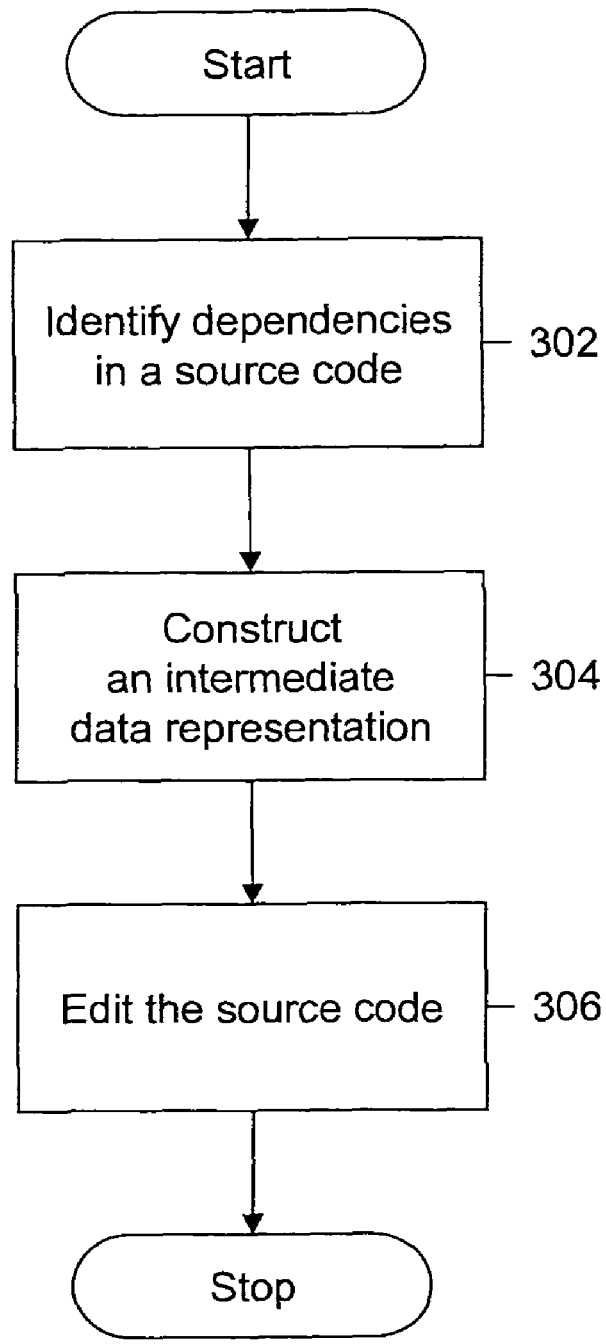
FIG. 3 is a flowchart illustrating a method for optimizing the source code, in accordance with various embodiments of the invention.

FIG. 3 is a flowchart illustrating a method for optimizing the source code, in accordance with various embodiments of the invention. At step 302, dependency identifier 104 identifies the dependencies in the source code. For this purpose, dependency identifier 104 parses the source code, by using the dependency compiler. In accordance with various embodiments of the invention, the dependency compiler can be specific to one or more programming languages of the source code.

At step 304, dependency-representing module 106 constructs the intermediate data representation. At step 306, editor 108 edits the source code. In order to edit the source code, editor 108 reads the intermediate data representation and adds the forward declarations to the source code files exhibiting incomplete type dependencies. The addition of the forward declarations nullifies the incomplete type dependencies.

Further, editor 108 reads the intermediate data representation to fix the incomplete type usages, by modifying the relevant source code files and removing the source code files from the context that resolved the incomplete types in the relevant source code files.

Figure 4:
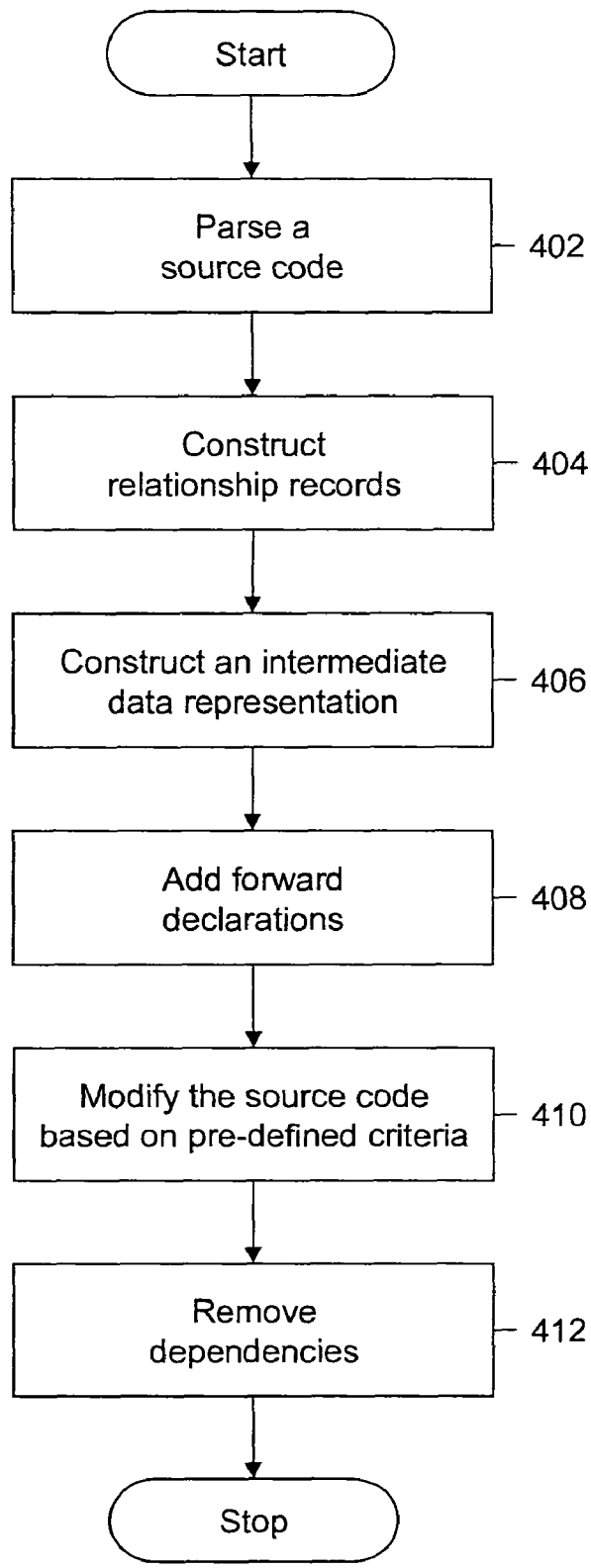
FIG. 4 is a flowchart illustrating a method for optimizing the source code, in accordance with an embodiment of the invention.

FIG. 4 is a flowchart illustrating a method for optimizing the source code, in accordance with an embodiment of the invention. At step 402, dependency identifier 104 parses the source code by using the dependency compiler. In accordance with various embodiments of the invention, the dependency compiler provides the details of all the dependencies, as an output. The dependency compiler is capable of detecting various dependencies included in the source code. Examples of these dependencies include, but are not limited to, the presence of a declaration and a definition of a function in two separate source code files, the presence of a declaration and a use of a function in two separate source code files, and an incomplete type usage.

At step 404, relationship-record constructor 202 constructs the relationship records. At step 406, dependency-representing module 106 constructs the intermediate data representation.

At step 408, editor 108 adds the forward declarations to the source code files exhibiting incomplete type dependencies. At step 410, editor 108 modifies the relevant source code files, based on the pre-defined criteria. In accordance with various embodiments of the invention, these pre-defined criteria include the presence of a declaration statement of a data type including multiple variables. If a data type is used in a declaration statement including multiple variables, then the declaration statement is split into individual declaration statements. In accordance with various embodiments of the invention, the pre-defined criteria also include the presence of data of an incomplete type that is aliased to another type. If data of an incomplete type is aliased to another type, then the usage of the incomplete type is changed, to match a corresponding forward declaration. In accordance with various embodiments of the invention, the pre-defined criteria further include the presence of a type definition of an object requiring a type qualifier. In such cases, type qualifiers are applied to the forward declarations, as per the type definition of the objects. At step 412, editor 108 removes the source code files from the context that resolved the incomplete types in the relevant source code files, and provides the optimized source code as an output.

In an exemplary embodiment of the invention, incomplete type dependencies are represented by the keywords USE, PUSE, and DUSE in the output of the dependency compiler, as follows:

<source code file>;USE/PUSE;<type>;<definition file for type>:<line number in source code file>, and <source code file>;DUSE;<type>;<struct/union/enum>:<line number in source code file> where,

<type> represents a data type used in <source code file>,

<definition file for type> represents another source code file that contains the definition of <type>, USE represents that <source code file> resolves the dependency of <type> from definition file for type>, PUSE represents that <source code file> resolves the dependency of <type> for pointer types from <definition file for type>, and DUSE represents incomplete types used as function arguments only, in <source code file>.

Further, the type information of the incomplete types is represented by the keywords STYPE, DEF, as follows:

<definition file for type>;STYPE;<typedef name>;<structure/union/enumeration tag name>; <struct/union/enum>; <number of dereference operators>, and <definition file for type>,DEF;<structure/union/enumeration tag name>;

where,

STYPE represents the typedef of any structure, union, and enumeration data type, and DEF represents the definition of structure, union, and enumeration.

Further, the keyword PTYPE is used to represent a pointer to structure, union, and enumeration. Otherwise, the keyword TYPE is used.

<definition file for type>;PTYPE;<tag name>;<typedef name>
<definition file for type>;TYPE;<tag name>;<typedef name>

Further, the keyword INC is used to represent that a definition file is included in a source code file, as follows:

<source code file>;INC;<definition file>;<line number in source code file>

The output of the dependency compiler is used by relationship-record constructor 202 to construct the relationship records, and by dependency-representing module 106 to construct the intermediate data representation. Further, an exemplary input and output of step 402 is illustrated below, with reference to C as the programming language of the source code. The following are four source code files, named a.h, b.h, c.h and test.c, provided as the input to system 102:

```
..............
..............
a.h
..............
..............
#ifndef a__h
#define a__h
typedef struct a {
int a;
} A;
#endif
..............
..............
b.h
..............
..............
#ifndef b__h
#define b__h
typedef union b {
    int x;
    char y;
    char z;
    } * B;
#endif
..............
..............
c.h
..............
..............
#ifndef c__h
#define c__h
enum C { TRUE, FALSE };
#endif
..............
..............
test.c
..............
..............
#include "a.h"
#include "b.h"
#include "c.h"
int foo ( enum C * );
main( )
{
    A *obj1;
    const B *obj2;
}
```

The following is the output of the dependency compiler:

```
test.c;INC;a.h;1
test.c;INC;b.h;2
test.c;INC;c.h;3
a.h;DEF;a
a.h;STYPE;A;a;struct;1 **
a.h;TYPE;a;A
b.h;DEF;b
b.h;STYPE;B;b;union;1 **
b.h;PTYPE;b;B
c.h;DEF;C **
test.c;DUSE;C;enum:4 **
test.c;USE;A;a.h:7 **
test.c;PUSE;B;b.h:8 **
```

The following is the output of system 102:

```
..............
..............
test.c
..............
..............
//commented #include "a.h"
//commented #include "b.h"
//commented #include "c.h"
enum C; /* c.h */ //Added
struct a; /* a.h */ //Added
union b; /* b.h */ //Added
int foo ( enum C * );
main( )
{
    struct a* obj1;
    union b* const *obj2;
}
```

In accordance with various embodiments of the invention, system 102 for optimizing the source code includes a means for identifying the dependencies, a means for constructing the intermediate data representation, and a means for editing relevant source code files in the source code. The means for identifying the dependencies includes a means for parsing the source code, to identify the dependencies. The means for constructing the intermediate data representation includes a means for constructing the relationship records. The means for editing the relevant source code files includes a means for adding the forward declarations, a means for modifying the source code and a means for removing the source code files from the context that resolved the dependencies.

Various embodiments of the invention provide an automatic configuration of the necessary attributes required during the process of optimization. For example, during the process of optimization, the information about the incomplete type dependencies can be accessed by system 102, without the manual intervention of the user. A data structure can be used to map programming languages to their corresponding information about incomplete type dependencies, in accordance with various embodiments of the invention. Further, system 102 may also offer the user a choice, to make a selection from the information about the incomplete type dependencies, corresponding to one or more programming languages.

Various embodiments of the invention replace the file dependencies with the incomplete type dependencies in the source code. Therefore, when a source code file is compiled, another source code file that was previously dependent on the source code file is not unnecessarily compiled. For example, a first source code file is dependent on a second source code file for a single incomplete type dependency only. In such an event, the second source code file needs to be compiled when the first source code file is compiled. Embodiments of the invention remove this file dependency. Therefore, the first source code file is no longer dependent on the second source code file, and it is not necessary to compile the second source code file when the first code file is compiled.

Various embodiments of the invention reduce the frequency of the compilation of the source code files. 'Frequency' pertains to the number of times a particular source code file is compiled. Consider, for example, that the source code files A, B, C, and D constitute a source code. When the source code is compiled, all the source code files are compiled. Consider, for example, that A and B include an incomplete type dependency alone. When A is changed and compiled, B is also compiled. If the incomplete type dependency between A and B is removed, in accordance with an embodiment of the invention, any further compilations of A will not result in the compilation of B. Hence, the frequency of the compilation of B, due to the presence of the incomplete type dependency, is reduced.

The optimized source code has fewer dependencies among the source code files. This has a ripple effect and reduces the number of lines in the source code. Therefore, a fewer number of source code files are dependent on other source code files. Hence, a fewer number of source code files need to be maintained. This significantly decreases the cost of maintaining the source code and improves its quality and productivity.

Further, the number of lines of the source code that need to be either compiled or interpreted are decreased. The number of lines of the source code is directly proportional to the compilation time. Therefore, a reduction in the number of lines of the source code results in a decrease in the compilation time. Moreover, the time taken to carry out other operations on the source code also reduces.

Further, the removal of unnecessary parts of the source code decreases its complexity and eases the understanding of the source code. The optimized source code is cleaner than the original source code.

Moreover, the optimized source code has relatively independent source code files. Therefore, the optimized source code has increased modularity.

Although the invention has been discussed with respect to specific embodiments thereof, these embodiments are merely illustrative, and not restrictive, of the invention. For example, a 'method for optimizing a source code' can include any type of analysis, manual or automatic, to anticipate the needs of optimizing the source code.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Any suitable programming language can be used to implement the routines of the various embodiments of the invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

In the description herein for the embodiments of the invention, numerous specific details are provided, such as examples of elements and/or methods, to provide a thorough understanding of the embodiments of the invention. One skilled in the relevant art will recognize, however, that an embodiment of the invention can be practiced without one or more of the specific details, or with other apparatus, systems, assemblies, methods, components, parts, and/or the like. In other instances, well-known operations are not specifically shown or described in detail to avoid obscuring aspects of the embodiments of the invention.

A 'computer program' for purposes of the embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a pre-determined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of the embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the various embodiments of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of the embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for optimizing a source code, the source code comprising a first source code file and a second source code file, the method comprising:

identifying, using a computing device, dependencies between a first source code file and a second source code file;

determining, using the computing device, one or more incomplete type dependencies from the dependencies, the one or more incomplete type dependencies comprising data of incomplete types used in the first source code file that are defined in the second source code file such that the first source code file is dependent on the second source code file, and has a requirement that the second source code file is included with the first source code file for compilation of the first source code file;

constructing an intermediate data representation including the one or more incomplete type dependencies, wherein constructing the intermediate data representation comprises constructing one or more relationship records of the dependencies, a relationship record comprising relationships between two or more source code files;

providing a user of the source code with information for the one or more incomplete type dependencies, the information including forward declarations suggested to be added in the first source code file such that the user is provided with information to make a selection from a set of instructions to modify the first source code file, the forward declarations including code that indicate an existence of incomplete type data in the first source code file that is undefined in the first source code file;

in response to receiving the selection from the user and based on the intermediate data representation, editing, using the computing device, the first source code file in the source code by adding the forward declarations to remove the one or more incomplete type dependencies from the first source code file, wherein the first source code file is no longer dependent on the second source code file based on the one or more incomplete type dependencies; and based on removing the one or more incomplete type dependencies from the first source code file, modifying the first source code file using the intermediate data representation such that the inclusion of the second source code file is not required for compilation of the first source code file.

2. The method of claim 1, wherein editing the first source code file comprises performing one or more instructions on the first source code file, the one or more instructions being selected by a user.

3. The method of claim 2 further comprising
providing the user a choice to make a selection from a set of instructions; and modifying the first source code file based on the one or more instructions selected by the user.

4. The method of claim 3, wherein the providing the user a choice comprises providing the user with line numbers and forward declarations to be added in the first source code file.

5. The method of claim 1, wherein the source code comprises one or more interface files and one or more implementation files.

6. The method of claim 1, wherein the dependencies comprise incomplete types of an implementation file being defined in an interface file.

7. The method of claim 1, wherein the incomplete type dependency is removed when there are no complete type dependencies between the first source code file and the second source code file.

8. The method of claim 1, wherein modifying the first source code file comprises modifying based on pre-defined criteria that include a presence of data of an incomplete type being aliased to another type, a declaration statement of a data type involving multiple variables, and a type definition of an object requiring a type qualifier.

9. A method for optimizing a source code, the source code comprising one or more source code files, the method comprising
identifying, using a computing device, dependencies among one or more source code files, the dependencies comprise incomplete type dependencies of a first source code file being defined in a second source code file such that the second source code file is included with the first source code file for compilation of the first source code file, wherein the identifying the dependencies comprises parsing the source code;
constructing an intermediate data representation, wherein constructing the intermediate data representation comprises constructing one or more relationship records of the incomplete type dependencies, a relationship record comprising relationships between two or more source code files;
providing a user of the source code with information for the incomplete type dependencies, the information including forward declarations suggested to be added in the first source code file such that the user is provided with information to make a selection from a set of instructions to modify the first source code file, the forward declarations including code that indicate an existence of incomplete type data in the first source code file that is undefined in the first source code file;
in response to receiving the selection from the user and based on the intermediate data representation, editing, by the computing device, relevant source code files in the source code, wherein the editing the relevant source code files comprises adding one or more forward declarations to remove the incomplete type dependencies from the relevant source code files such that the first source code file is no longer dependent on the second source code file based on the incomplete type dependencies;
modifying the source code based on pre-defined criteria, wherein the pre-defined criteria comprise presence of data of an incomplete type being aliased to another type, presence of one of the one or more forward declarations, a declaration statement of a data type involving multiple variables, and a type definition of an object requiring a type qualifier; and
removing one or more source code files that resolved the dependencies from relevant source code files.

10. The method of claim 9, wherein the pre-defined criteria comprise presence of no complete type dependencies, wherein the incomplete type dependency is removed when there are no complete type dependencies between the first source code file and the second source code file.

11. A method for optimizing a source code, the source code comprising one or more interface files and one or more implementation files, the method comprising:
identifying, using a computing device, dependencies among one or more interface files and one or more implementation files, the dependencies comprise incomplete type dependencies of an implementation file being defined in an interface file such that the interface file is included with the implementation file for compilation of the implementation file, wherein the identifying the dependencies comprises parsing the source code;
constructing an intermediate data representation, wherein constructing the intermediate data representation comprises constructing one or more relationship records of the dependencies, a relationship record comprising relationships between two or more source code files;
providing a user of the source code with information for the one or more incomplete type dependencies, the information including forward declarations suggested to be added in the implementation file such that the user is provided with information to make a selection from a set of instructions to modify the implementation file, the forward declarations including code that indicate an existence of incomplete type data in the implementation file that is undefined in the implementation file;
in response to receiving the selection from the user and based on the intermediate data representation, editing, by the computing device, relevant source code files in the source code, wherein the editing the relevant source code files comprises modifying the source code based on pre-defined criteria, wherein the pre-defined criteria comprise presence of data of an incomplete type being aliased to another type and presence of one of the one or more forward declarations, a declaration statement of a data type involving multiple variables, and a type definition of an object requiring a type qualifier; and
removing one or more interface files that resolved the dependencies from relevant source code files.

12. A storage device including a non-transitory machine readable storage medium comprising instructions for optimizing a source code executable by a computer processor, the source code comprising a first source code file and a second source code file, the non-transitory machine readable storage medium comprising one or more instructions that when executed by the computer processor are operable for:

identifying dependencies between the first source code file and the second source code file;

determining one or more incomplete type dependencies from the dependencies, the one or more incomplete type dependencies comprising data of incomplete types used in the first source code file that are defined in the second source code file such that the first source code file is dependent on the second source code file, and has a requirement that the second source code file is included with the first source code file for compilation of the first source code file;

constructing an intermediate data representation including the one or more incomplete type dependencies, wherein constructing the intermediate data representation comprises constructing one or more relationship records of the dependencies, a relationship record comprising relationships between two or more source code files;

providing a user of the source code with information for the one or more incomplete type dependencies, the information including forward declarations suggested to be added in the first source code file such that the user is provided with information to make a selection from a set of instructions to modify the first source code file, the forward declarations including code that indicate an existence of incomplete type data in the first source code file that is undefined in the first source code file;

in response to receiving the selection from the user and based on the intermediate data representation, editing the first source code file in the source code by adding the forward declarations to remove the one or more incomplete type dependencies from the first source code file wherein the first source code file is no longer dependent on the second source code file based on the one or more incomplete type dependencies; and based on removing the one or more incomplete type dependencies from the first source code file, modifying the first source code file using the intermediate data representation such that the inclusion of the second source code file is not required for compilation of the first source code file.

13. The storage device of claim 12, wherein modifying the first source code file comprises modifying, based on pre-defined criteria that include a presence of data of an incomplete type being aliased to another type, a declaration statement of a data type involving multiple variables, and a type definition of an object requiring a type qualifier.

14. An apparatus for optimizing a source code, the apparatus comprising a processing system including a computer processor coupled to a display and user input device; and a non-transitory computer readable storage device including one or more instructions for optimizing a source code executable by the computer processor, the source code comprising a first source code file and a second source code file, the one or more instructions when executed by the computer processor cause the computer processor to perform operations comprising:

identifying dependencies between a first source code file and a second source code file;

determining one or more incomplete type dependencies from the dependencies, the one or more incomplete type dependencies comprising data of incomplete types used in the first source code file that are defined in the second source code file such that the first source code file is dependent on the second source code file, and has a requirement that the second source code file is included with the first source code file for compilation of the first source code file;

constructing an intermediate data representation including the one or more incomplete type dependencies, wherein constructing the intermediate data representation comprises constructing one or more relationship records of the dependencies, a relationship record comprising relationships between two or more source code files;

providing a user of the source code with information for the one or more incomplete type dependencies, the information including forward declarations suggested to be added in the first source code file such that the user is provided with information to make a selection from a set of instructions to modify the first source code file, the forward declarations including code that indicate an existence of incomplete type data in the first source code file that is undefined in the first source code file;

in response to receiving the selection from the user and based on the intermediate data representation, editing the first source code file in the source code by adding the forward declarations to remove the one or more incomplete type dependencies from the first source code file wherein the first source code file is no longer dependent on the second source code file based on the one or more incomplete type dependencies; and based on removing the one or more incomplete type dependencies from the first source code file, modifying the first source code file using the intermediate data representation such that the inclusion of the second source code file is not required for compilation of the first source code file.

15. The apparatus of claim 14, wherein operations for modifying the first source code file comprises modifying, based on pre-defined criteria that include a presence of data of an incomplete type being aliased to another type, a declaration statement of a data type involving multiple variables, and a type definition of an object requiring a type qualifier.

* * * * *